(12) United States Patent
Sharma et al.

(10) Patent No.: US 11,290,530 B2
(45) Date of Patent: Mar. 29, 2022

(54) CUSTOMIZABLE, PULL-BASED ASSET TRANSFER REQUESTS USING OBJECT MODELS

(71) Applicant: Apple Inc., Cupertino, CA (US)

(72) Inventors: Vinay Sharma, Palo Alto, CA (US); Sergiy Buyanov, Richmond Hill (CA); Yaozong Gao, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/222,553

(22) Filed: Dec. 17, 2018

(65) Prior Publication Data

US 2019/0373050 A1  Dec. 5, 2019

Related U.S. Application Data

(60) Provisional application No. 62/679,706, filed on Jun. 1, 2018.

(51) Int. Cl.
*H04L 29/08* (2006.01)
*G06F 3/0482* (2013.01)
*H04L 67/104* (2022.01)
*H04L 67/63* (2022.01)

(52) U.S. Cl.
CPC .......... *H04L 67/104* (2013.01); *H04L 67/327* (2013.01); *G06F 3/0482* (2013.01)

(58) Field of Classification Search
CPC ..... H04L 67/104; H04L 67/327; H04L 67/06; H04L 67/10; H04L 67/24; H04L 67/32; H04L 63/10; H04L 41/28; H04L 29/06; H04L 29/08; H04L 67/1002; H04L 65/00; G06F 3/0482; G06F 16/40; G06F 16/58; G06F 16/583; G06F 16/783; G06F 3/04842; G06F 3/04847; G06F 16/27; G06F 16/176; H04W 12/08; H04W 84/10; H04W 92/18; H04N 21/632; A63F 13/34; G06T 7/00
USPC .......................... 709/206, 217; 382/115, 118
See application file for complete search history.

(56) References Cited

U.S. PATENT DOCUMENTS

| | | | |
|---|---|---|---|
| 5,751,286 A | 5/1998 | Barber | |
| 6,813,395 B1 | 11/2004 | Kinjo | |
| 7,068,309 B2 | 6/2006 | Toyama | |
| 7,403,642 B2 | 7/2008 | Zhang | |

(Continued)

FOREIGN PATENT DOCUMENTS

| | | |
|---|---|---|
| EP | 1594286 A1 | 11/2005 |
| WO | 2005034373 A2 | 4/2005 |

OTHER PUBLICATIONS

Apple Inc. "Apple—iLife—iPhoto—Organize" Apr. 4, 2005.

(Continued)

*Primary Examiner* — James N Fiorillo
(74) *Attorney, Agent, or Firm* — Blank Rome LLP

(57) ABSTRACT

Sharing media items includes receiving, on a first device, user input indicating a request for media items on a second device, wherein the request identifies an object represented in the media items, obtaining, on a requesting device, an object model for the object, generating a pull request comprising pull request parameters, wherein the pull request parameters comprise the object model, and transmitting the pull request from the first device to the second device, wherein the object model identifies the object represented in the media items.

20 Claims, 7 Drawing Sheets

(56) References Cited

U.S. PATENT DOCUMENTS

| | | | |
|---|---|---|---|
| 7,428,321 B1* | 9/2008 | Shah | G06K 9/00268 |
| | | | 382/118 |
| 8,756,641 B2* | 6/2014 | Ivanov | H04N 21/4104 |
| | | | 725/110 |
| 9,269,022 B2* | 2/2016 | Rhoads | G06K 9/4671 |
| 10,051,103 B1* | 8/2018 | Gordon | G06F 21/36 |
| 10,606,824 B1* | 3/2020 | Fire | H04W 4/021 |
| 2002/0099730 A1 | 7/2002 | Brown | |
| 2003/0059123 A1 | 3/2003 | Omori | |
| 2003/0063770 A1 | 4/2003 | Svendsen | |
| 2003/0103247 A1 | 6/2003 | Masera | |
| 2003/0195883 A1 | 10/2003 | Mojsilovic | |
| 2004/0213437 A1* | 10/2004 | Howard | G06K 9/00248 |
| | | | 382/115 |
| 2004/0264780 A1 | 12/2004 | Zhang | |
| 2004/0264810 A1 | 12/2004 | Taugher | |
| 2005/0256866 A1 | 11/2005 | Lu | |
| 2006/0048059 A1 | 3/2006 | Etkin | |
| 2006/0271593 A1* | 11/2006 | De Mes | G06F 16/58 |
| 2007/0150487 A1 | 6/2007 | Christian | |
| 2007/0162753 A1* | 7/2007 | Nakano | H04L 63/061 |
| | | | 713/171 |
| 2008/0059631 A1* | 3/2008 | Bergstrom | H04L 67/1072 |
| | | | 709/224 |
| 2008/0089610 A1* | 4/2008 | Tao | G06T 17/05 |
| | | | 382/285 |
| 2009/0319672 A1* | 12/2009 | Reisman | H04N 21/482 |
| | | | 709/227 |
| 2010/0049825 A1* | 2/2010 | Todoroki | H04L 67/06 |
| | | | 709/217 |
| 2010/0146055 A1* | 6/2010 | Hannuksela | G11B 27/105 |
| | | | 709/206 |
| 2011/0013810 A1* | 1/2011 | Engstrom | G06K 9/00288 |
| | | | 382/118 |
| 2011/0208958 A1* | 8/2011 | Stuedi | G06F 16/40 |
| | | | 713/150 |
| 2013/0013698 A1* | 1/2013 | Relyea | H04L 67/06 |
| | | | 709/206 |
| 2014/0089307 A1* | 3/2014 | Garside | G06F 16/738 |
| | | | 707/736 |
| 2014/0123041 A1* | 5/2014 | Morse | G11B 27/105 |
| | | | 715/765 |
| 2014/0168477 A1* | 6/2014 | David | G06Q 30/0639 |
| | | | 348/240.2 |
| 2015/0185856 A1* | 7/2015 | Liu | H04N 21/4223 |
| | | | 345/173 |
| 2015/0324099 A1* | 11/2015 | Tang | G06F 3/04842 |
| | | | 715/716 |
| 2017/0024484 A1* | 1/2017 | Qiu | G06Q 30/0269 |
| 2017/0206416 A1* | 7/2017 | Chen | G06T 7/00 |
| 2018/0027070 A1* | 1/2018 | Jhanji | H04L 67/1046 |
| | | | 709/217 |
| 2018/0107866 A1* | 4/2018 | Li | G06K 9/00288 |
| 2018/0260824 A1* | 9/2018 | Toomer | G06Q 30/0215 |
| 2018/0376106 A1* | 12/2018 | Pandey | H04N 7/148 |
| 2019/0122443 A1* | 4/2019 | Stocker | G06T 19/006 |
| 2019/0141041 A1* | 5/2019 | Bhabbur | H04L 9/3213 |
| 2019/0171689 A1* | 6/2019 | Kachkach | G06F 16/9535 |
| 2019/0339822 A1* | 11/2019 | Devine | G06F 3/0484 |

OTHER PUBLICATIONS

Apple Inc. "Apple—iLife—iPhoto—Share Online" Apr. 4, 2005.
Apple Inc. "Apple—iLife—iPhoto" Apr. 4, 2005.
Bolin et al., "An Automatic Facial Feature Finding System For Portrait Images," Proceedings of IS&T PICS Conference 2002.
Cootes et al., "Constrained Active Appearance Models," 8th International Conf on Computer Vision, vol. 1, 748-754, IEEE Computer Society Press, Jul. 2001.
Davis et al., "From Context to Content: Leveraging Context to Infer Media Metadata," MM'04, Oct. 2004, 188-195.
Ghoshal et al., "Hidden Markov Models for Automatic Annotation and Content-based Retrieval of Images and Video," SIGIR'05, 2005, 544-551.
Kuchinsky, Allan, et al., "FotoFile: A Consumer Multimedia Organization and Retrieval System," May 1999 ACM CHI'99.
Mathes, Adam, "Folksonomies—Coperative Classification and Communication Through Shared Metadata," Dec. 2004, vww.adammathes. com <http://www.adammathes.com/academic/computer-mediated-communication/folksonomies.html>.
Naaman et al., "Leveraging context to resolve identify in photo albums," Proc. of the 5th ACM/IEEE Joint Conf. on Digital Libraries, Jun. 2005, 178-187.
Turk et al., "Eigenfaces for Recognition," Journal of Cognitive Neuroscience, vol. 3, No. 1, 71-86, 1991.
Vartiainen, "Using metadata and context information in sharing personal content of mobile users," Master Thesis, Univ. of Helsinki, 2003.
Wiskott, "Phantom Faces for Face Analysis," Pattern Recognition 30(6):837-846 (1997).
Yuille et al., "Feature Extraction from Faces Using Deformable Templates," Int. Journal of Comp. Vis., vol. 8, Iss. 2, 99-111, 1992.

* cited by examiner

CUSTOMIZABLE, PULL-BASED ASSET TRANSFER REQUESTS USING OBJECT MODELS

BACKGROUND

This disclosure relates generally to the field of media transfer, and more particularly to the field of customizable, pull-based asset transfer requests using object models. With the proliferation of camera-enabled mobile devices, users can capture numerous photos of any number of people and objects in many different settings and geographic locations. For example, a user may take and store hundreds of photos and other media items on their mobile device. However, many of those photos may be relevant to other users. Right now, other users who may have interest in those media items may have the onus of reminding the mobile device user to share the photos, while the mobile device user has little incentive to share a copy of the media items with the requesting user.

SUMMARY

In one embodiment, a method for sharing media items is described. The method includes receiving, on a first device, user input indicating a request for media items on a second device, wherein the request identifies an object represented in the media items, obtaining, on a requesting device, an object model for the object, generating a pull request comprising pull request parameters, wherein the pull request parameters comprise the object model, and transmitting the pull request from the first device to the second device, wherein the object model identifies the object represented in the media items. In another embodiment, the method may be embodied in computer executable program code and stored in a non-transitory storage device. In yet another embodiment, the method may be implemented in an electronic device having image capture capabilities.

In another embodiment, another method for sharing media items is described. The method includes receiving, from a sending device, a pull request for media items on the source device, wherein the pull request comprises pull request parameters, and wherein the pull request parameters comprise an object model, identifying, based on the object model, one or more media items stored on the source device that include an object represented by the object model, and sending the one or more media items to the requesting device. In another embodiment, the method may be embodied in computer executable program code and stored in a non-transitory storage device. In yet another embodiment, the method may be implemented in an electronic device having image capture capabilities.

DETAILED DESCRIPTION

Figure 1:
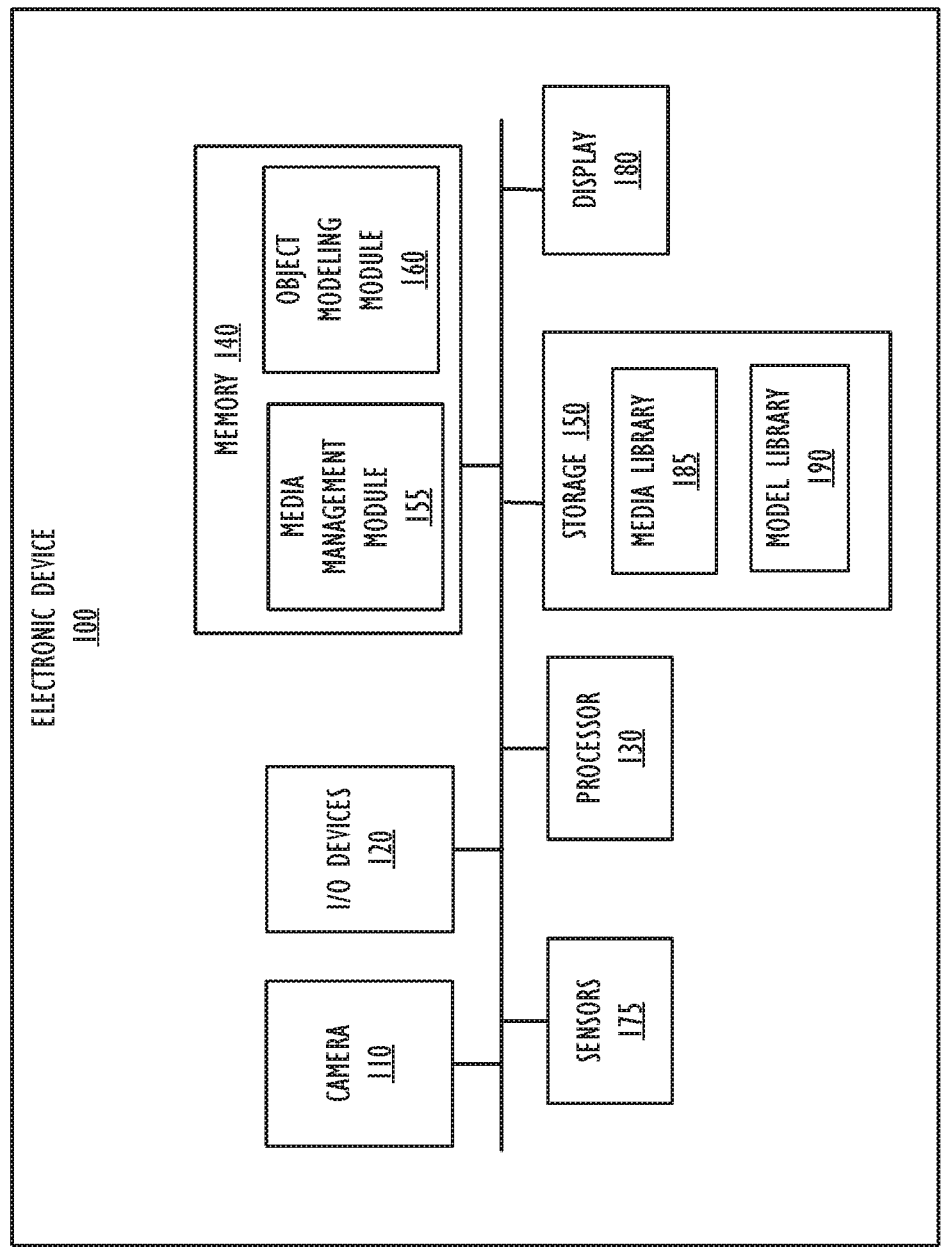
FIG. 1 shows, in block diagram form, a simplified electronic device according to one or more embodiments.

This disclosure pertains to systems, methods, and computer readable media for providing customizable pull-based asset transfer requests using object models. More specifically, this disclosure relates to sending a pull request from a requesting device to a source device, where the pull request includes a model of an object of interest to the requestor. The pull request may include additional information, such as additional pull parameters which delineate the media items requested by a user. The pull request may also include a source from which the media items are requested. For example, a user may submit, from a requesting device, a pull request for all images that include the user. As such, the requesting device may transmit a pull request to the source device that includes a model of the user along with pull parameters identifying the requested data type as image files. Further, the pull parameters may specify a particular span of time, geographic location, or type of media item.

The object model in the pull request may be used at the source device to identify media items that include representations of the object. The source device may query available media items to identify the requested media items, and transfer the requested media items to the requesting device. In one or more embodiments, the source device may present an interface to a user of the source device allowing the user to preview the requested items and confirm that they may be transmitted to the requesting device. If the user of the source device confirms that the images may be transmitted, the media items may be transmitted to the requesting device. According to one or more embodiments, initially, a thumbnail image or other preview type information may be sent to the requesting device. A confirmation window may be displayed on the requesting device along with the preview information, and a user of the receiving device may confirm instructions to import the requested data. In response to detecting confirmation, the requesting device may request transmission of the media items and the source device may transmit the requested media items.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100A and 100B). Further, as part of this description, some of this disclosure's drawings may be provided in the form of a flow diagram. The boxes in any particular flow diagram may be presented in a particular order. However, it should be understood that the particular flow of any flow diagram or flow chart is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

Referring to FIG. 1, a simplified block diagram of an electronic device 100 is depicted in accordance with one or more embodiments of the disclosure. Electronic device 100 may be part of a multifunctional device such as a mobile phone, tablet computer, personal digital assistant, portable music/video player, or any other electronic device that includes a camera system. Further, electronic device 100 may be part of a larger system of components that includes a camera and a display. Electronic Device 100 may be connected to other devices across a network such as other mobile devices, tablet devices, desktop devices, as well as network storage devices such as servers and the like. Electronic device 100 may be configured to capture image data corresponding to a scene and use the captured image data to render views on a display viewable by a user.

Electronic Device 100 may include a processor 130. Processor 130 may be a central processing unit (CPU). Processor 130 may alternatively, or additionally, include a system-on-chip such as those found in mobile devices and include zero or more dedicated graphics processing units (GPUs). Electronic Device 100 may also include memory 140 and storage 150. Memory 140 and storage 150 may each include one or more different types of memory, which may be used for performing device functions in conjunction with processor 130. For example, memory 140 may include cache, ROM, and/or RAM. Memory 140 may store various programming modules during execution, including media management module 155 and object modeling module 160. In one or more embodiments, storage 150 may comprise cache, ROM, RAM, and/or non-volatile memory, and may store media items in a media library 185. Media library 185 may include various types of media items, such as image files, video files, audio files, enhanced image files, and the like. An enhanced image may include a "snapshot image", a first subset of image from a pre-capture image sequence, and a second subset of image from a post-capture image sequence, and wherein the first and second subsets of images may be played back as a video sequence (which may also include the snapshot image itself). The enhanced image may include a concurrently captured audio recording, according to one or more embodiments. Further, according to one or more embodiments, media library 185 may include a combination of types of media items.

Electronic device 100 may also include one or more cameras 110. Each camera 110 may include an image sensor, a lens stack, and other components that may be used to capture images. Further, in some embodiments image sensors may be shared between different lens stacks. In one or more embodiments, cameras 110 may be configured to capture still pictures, enhanced photos, video feed, or the like.

Electronic device 100 may include one or more sensors 175, which may provide information about a surrounding environment, such as contextual information. For example, sensors 175 may include sensors configured to detect brightness, depth, location, and other information regarding the environment. Electronic device 100 may also include a display 180, which may be an additive display. For example, display 180 may be a transparent or semi-opaque display, such as a heads-up display, by which an image may be projected over a transparent surface. Thus, display 180 may be comprised of a projector and a surface, or may just include the projector. Further, display 180 may be a transparent display, such as an LCD display and/or a head mounted display. Electronic device 100 may additionally include I/O devices 120, such as speakers and the like. In one or more embodiments, the various I/O devices 120 may be used to assist in image capture, as well as generating a pull request to obtain media items from a distal electronic device. According to one or more embodiments, I/O devices 120 may additionally include a touch screen, mouse, track pad, and the like.

Memory 140 may include instructions, such as computer readable code executable by processor 130 to perform various actions. For example, media management module 155 may include instructions that cause electronic device 100 to assist in managing media items captured by camera 110. Media management module 155 may manage media items captured, for example by camera 110, by storing captured media items, such as image files, video files, audio files, enhanced image files, and the like. In one or more embodiments, additional data may be used to "tag" the images, such as geographic location, recognized faces or objects, date, time, and the like. Further, in one or more embodiments, media management module 155 may generate and send pull requests for images stored on distal devices. For example, a user of electronic device 100 may indicate interest in obtaining media items from a distal device that include a particular object. The media management module 155 may obtain a model of the object, for example from model library 190, and send the model as part of a pull request to the distal device. In one or more embodiments, the media management module 155 may additionally generate or define additional pull request parameters. For example, the pull request parameters may indicate that media items of a particular type are requested, from a particular geographic location, a particular time span, or the like. Additional pull request parameters may be incorporated into the pull request as privacy parameters (e.g. indicating a level of privacy associated with the media items), temporal parameters (e.g. indicating a bounded time period from which media items are to be considered), geographic parameters (e.g., bounded geographic information from which media items are to be considered), and media type parameters (such as image files, video files, audio files, enhanced image files, and the like). The pull request parameters may be generated automatically, or determined based on user input. For example, the media management module 155 may generate and present suggestions to a user, and the user may select one or more additional pull request parameters through user input.

According to one or more embodiments, the media management module 155 may also receive pull requests from distal devices, and locate and transmit media items that satisfy the pull request. As an example, the media management module 155 may receive a pull request that includes an object model, identify media items that satisfy the object model, and transmit them to the distal device. As described above, the pull request may include additional pull parameters which define the media items that should be obtained. The media management module 155 may further process the pull request by culling the media items that contain representations of the object model based on the pull request parameters. According to one or more embodiments, the media management module may generate and present a confirmation message to a user. The confirmation message may prompt the user to confirm that the gathered media items may be sent to the requestor. The confirmation message may request confirmation for individual media items, or multiple media items at one time. The confirmation message may be presented, for example, on display 180.

In one or more embodiments, the object modeling module 160 may generate a model of an object of interest. As an example, the object to be modeled may be a person, a pet, an animal, an inanimate object, or any other object. The object modeling module 160 may generate object models for objects that appear with a predetermined frequency, or for which a user has requested that an object model be generated. In one or more embodiments, the model should be compact enough to store and utilize on a mobile device while still being robust enough to uniquely identify an object. The object modeling module may identify a representation of an object in a media item, and request identity information from a user. As an example, the object modeling module 160 may present an identification message to a user, for example on display 180, to determine whether a particular representation of an object should be used to generate a model, and to request an identity for the object from the user. In one or more embodiments, the object modeling module 160 may generate visual models, for example from image data such as image or video files. The object modeling module 160 may also generate audio models, for example from audio data, such as audio recordings, audio streams in video files, audio content from enhanced images, and the like. The various object models may be stored in model library 190.

According to one or more embodiments, the object model is a generic representation of an object. Some objects, such as faces, have strong statistical regularities. Generating the object model may include determining a feature representation of the object such that a distance between representations of the object are smaller than that of a different object. Said another way, generating the object model may include identifying what makes representations of the same object similar, and what makes representations of different objects dissimilar. For example, in a visual model of a person, identifiable visual characteristics of an individual's face. Because human faces have strong statistical regularities, faces of a single identity may lie on a low-dimensional manifold. Feature detection may be utilized to determine the identifiable features. Similarly, feature detection may be performed among audio recordings of a same person in order to determine identifiable characteristics of a person's voice. In one or more embodiments, user input may be utilized to hone the accuracy of an object model. According to one or more embodiments, the object modeling module may further refine an object model based on additional data received regarding the object. For example, if the model library 190 includes an object model of a user of a distal device, and the electronic device 100 receives a pull request from the distal device that includes an object model of the user as it was generated on the distal device, the object modeling module 160 may utilize the received object model to enhance the local version of the object model of the user of the distal device. That is, the user's own device is likely to have a more refined object model of the user because the device likely has more images of the user than another user's device. As another example, an object model for a particular object on a distal device will likely be generated from different underlying media data. Thus, a local version of an object model may be improved by taking into consideration the received object model for the same object, according to one or more embodiments.

Figure 2:
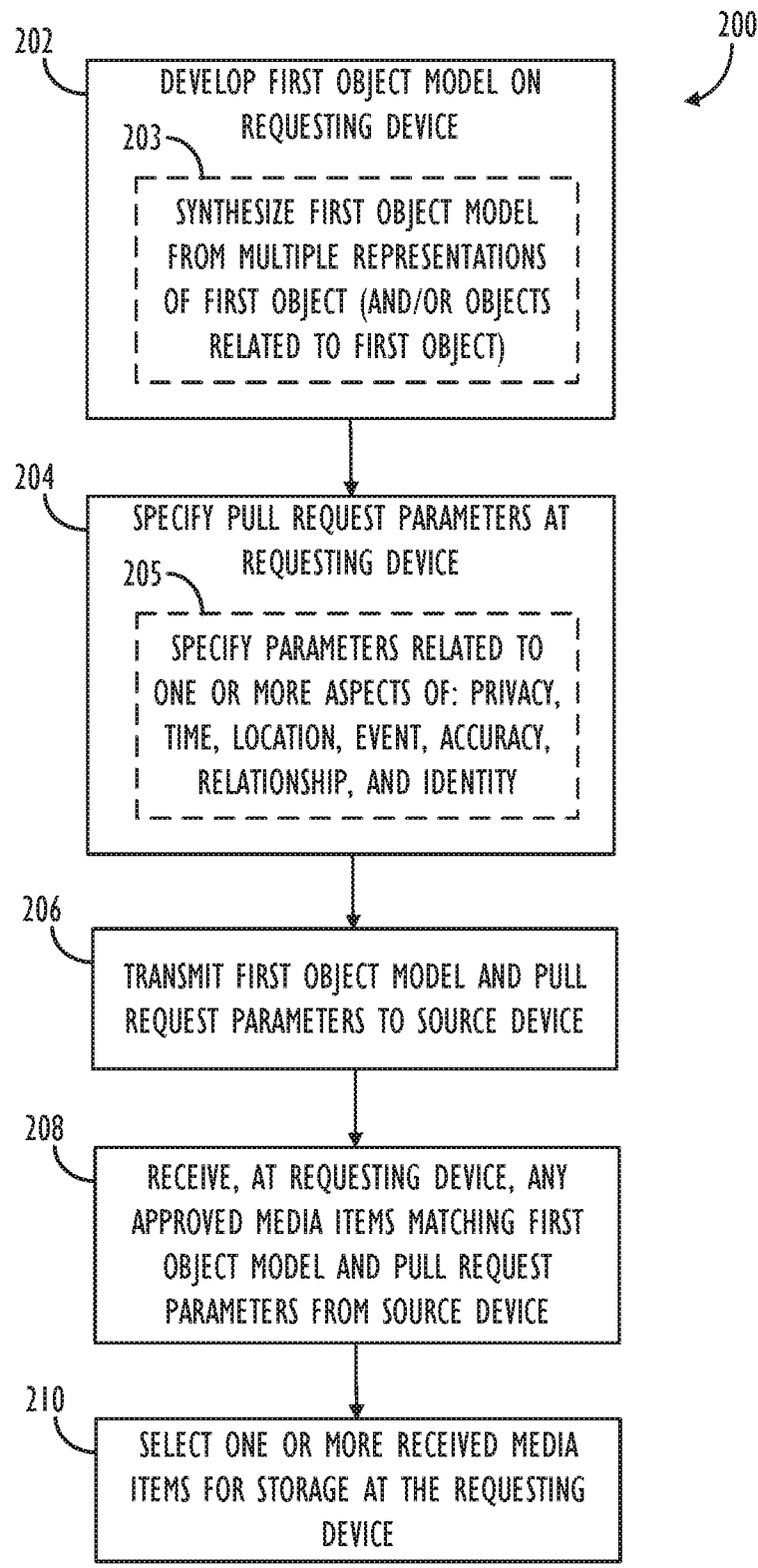
FIG. 2 shows, in flowchart form, a method for generating a pull request, according to one or more embodiments.

FIG. 2 shows, in flowchart form, an overview of a method for generating a pull request, according to one or more embodiments. With respect to each of the flowcharts described below, although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to the various components of FIG. 1. However, it should be understood that the various actions may be taken by alternative components, according to one or more embodiments.

The flowchart 200 begins at 202, and the object modeling module 160 develops a first object model on a requesting device. In one or more embodiments, at 203, the object modeling module 160 synthesizes the first object model from multiple representations of the first objects, and/or objects related to the first object. The flowchart continues at 204 and the media management module 155 specifies asset pull request parameters at the requesting device. In one or more embodiments, at 205, the specified parameters are related to one or more aspects of privacy, time, location, event, accuracy, relationship, and identity.

At 206, the first object model and pull request parameters are transmitted to the source device. Then, at 208, the requesting device receives any approved media items. At 210, one or more of the media items received from the source may be selected for local storage.

Figure 3:
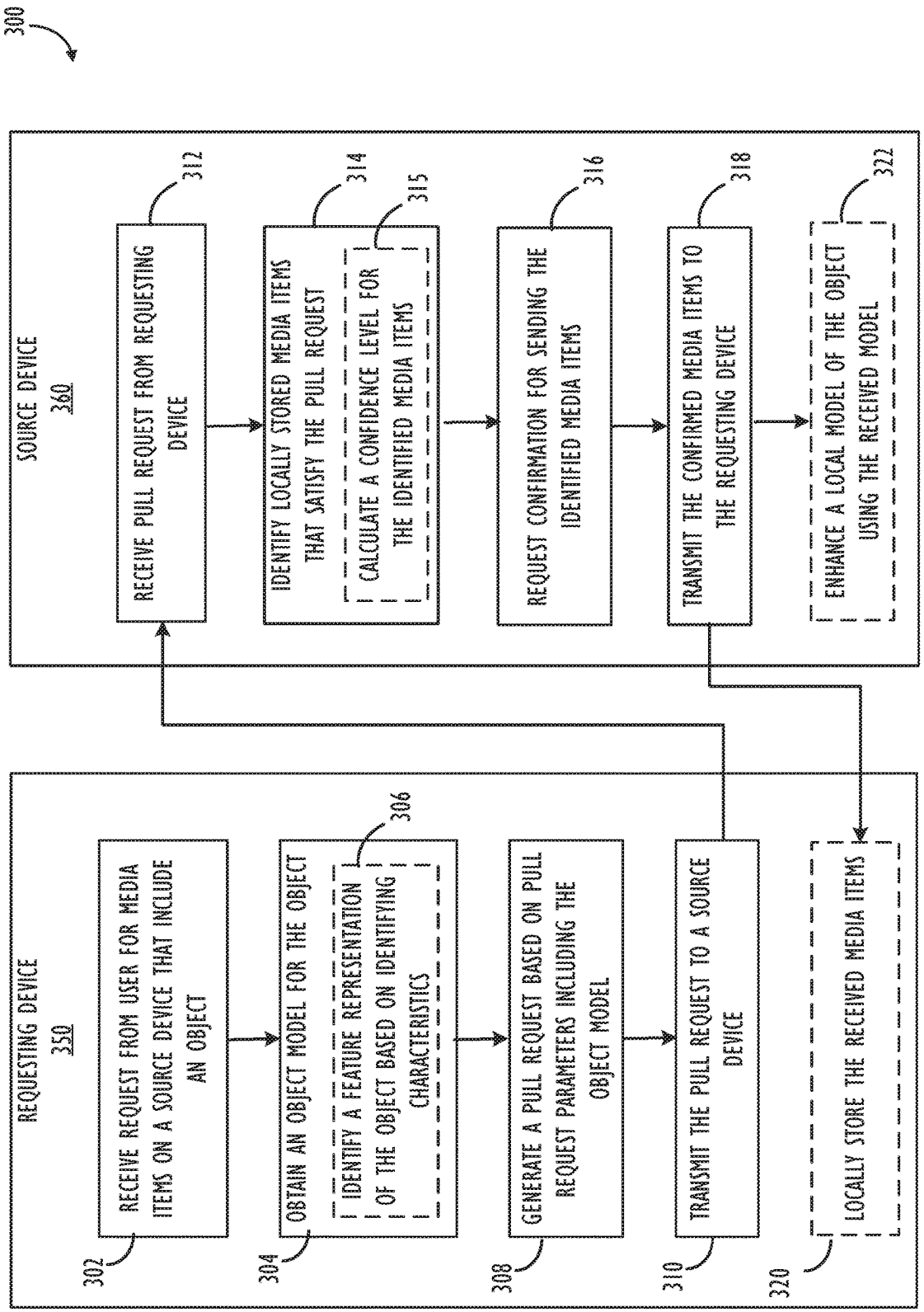
FIG. 3 shows, in flowchart form, a method for sharing media items, according to one or more embodiments.

FIG. 3 shows, in flowchart form, a method for sharing media items, according to one or more embodiments. Specifically, FIG. 3 shows interaction between a requesting device 350 and a source device 360. In one or more embodiments, each of requesting device 350 and source device 360 may be an electronic device and have similar components to those described above with respect to electronic device 100. In one or more embodiments, each of requesting device 350 and source device 360 may include only a portion of the described components, or additional components. For example, in one or more embodiments, the source device 360 may not have a model library 190.

The flowchart begins at 302 and the requesting device 350 receives a request from a user of the requesting device 302 for media items stored on a source device 360 that includes an object. In one or more embodiments, the request may be received through a user interface, for example using a voice command or a touch screen. In one or more embodiments, the user may identify the object requested based on available object models in the model library 190 of the requesting device 350. According to one or more embodiments, a user may also identify additional pull request parameters, such as additional objects represented in the media item, type of media item, a time span from which the media item was captured, events captured in the media item, accuracy (such as a threshold confidence value that the media item includes a representation of the object), relationship (such as all objects that have a specified relationship with the requestor), geographic location, and the like. In one or more embodiments, the additional parameters may be specified by a user, such as through an interface, or may be suggested to a user through a user prompt. For example, for a particular object requested by the user, the media management module 155 may suggest particular additional pull request parameters, such as various time periods or geographic locations associated with the media items depicting the object, or the like.

The flowchart continues at 304 where the requesting device obtains an object model for the object. As described above, the model library 190 may include object models for objects that appear frequently in media items, such as people, pets, or inanimate objects. Further, the model library 190 may include multiple types of models, such as audio models or visual models. Generally, as shown in 306, object models may be generated by identifying a feature representation of an object based on identifying characteristics of the object. In a visual model, identifying attributes of a user's face may be used, for example, based on feature detection of the face. Similarly, an audio model will include identifying characteristics of an object's sound, such as speaker identification. In general, the model is a library-specific representation of an object. That is, an object model for a particular object will vary from one device to another based on the media library from the respective devices on which the models are generated. Additional representations of the object added to the media library 185 may result in a refined object model. In one or more embodiments, in response to the requesting device 350 capturing an image, feature detection may be utilized to perform a preliminary guess as to an identity of an object represented in the media item. In one or more embodiments, the object modeling module 160 may present a prompt to a user requesting confirmation that the correct object has been identified so that the media item is applied to the proper object model. Further, in one or more embodiments, a model may be associated with a visual model as well as an audio model. The visual and audio models may be linked or associated with each other in the model library 190 such that when a user request media items containing representations of an object, both audio and visual representations may be captured.

At 308, a pull request is generated based on pull request parameters. The pull request parameters may include the object model obtained at 304, as well as any additional pull request parameters received at 302. Then, at 310, the pull request is transmitted to the source device 360. In one or more embodiments, the pull request may be transmitted using any kind of transmission, such as Bluetooth, near-field communication, or any other kind of wireless or wired communication means.

The flowchart continues at 312 and the source device 360 receives the pull request from the requesting device 350. At 314, the media management module 155 of the source device 360 identifies locally stored media items that satisfy the pull request. In one or more embodiment, the media management module 155 of the source device 360 may utilize the object model for the object received from the requesting device 350 even if the source device 360 has a locally stored object model for the object in the model library 190 of source device 360. In one or more embodiments, if a requesting device 350 is requesting media items including representation of the particular object, the requesting device may have a more refined model of the object than the source device. For example, a user of a requesting device may be better represented in an object model on the requesting device because the user may be in more media items captured and stored on the requesting device, whereas the user of the requesting device may appear in relatively few media items stored on the source device 360.

In one or more embodiments, identifying locally stored media items may also include refining the collection of identified media items that match the object model based on additional pull request parameters in the pull request. For example, the additional pull request parameters may indicate that an additional object model should be used to identify another object in the images, such as another or additional person, animal, or inanimate object. The additional pull request parameters may also specify media types, geographic locations, and the like. For example, if the media type is specified as an enhanced image, and a visual and audio model of a person are received, then any enhance image where a person appears or can be heard is identified. That is, both the visual and the audio model for an object may be used. The flowchart optionally includes, at 315, calculating a confidence level for the identified media items. In one or more embodiments, the confidence level may indicate how strong of a match a particular media item is to the received object model, as well as the additional pull request parameters. In one or more embodiments, the confidence level may be a set of values each associated with an identified media item, or may be a single value for the entire set of identified media items. Further, in one or more embodiments, confidence levels may be calculated for subsets of the media items identified, such as a particular date, a type of media item, and the like.

The flowchart continues at 316, where the media management module 155 of the source device 360 request confirmation for sending the identified media items. In one or more embodiments, the media management module 155 may request authorization or confirmation before sending the identified locally stored media items. For example, the media management module 155 may prompt a user of the source device 360 to confirm that the identified media items may be transmitted to the requesting device 350. In one or more embodiments, the authorization may include a user interface that allows the user of the source device 360 to view the identified media items and select media items to remove from the group such that the selected media items are not sent to the requesting device 350. At 318, the source device 360 transmits the authorized media items to the requesting device 350 in response to an affirmative authorization of the user of the source device 360. In one or more embodiments, the media items may be transmitted using any kind of transmission, such as Bluetooth, near-field communication, or any other kind of wireless or wired communication means. Then, at 320, the requesting device 350 may store the received media items to a media library 185 of requesting device 350. In one or more embodiments, the media management module 155 of the requesting device 350 may present a prompt to the user of the requesting device 350 that allows a user to select or de-select media items for local storage. Further, in one or more embodiments, the flowchart can continue at 322 and the source device 360 can enhance a local object model of the object from the pull request with the receive object model. That is, because the received object model is generated using a different media library than the locally stored object model for the same object, the locally stored object model may be enhanced based on the received object model, according to one or more embodiments.

Figure 4:
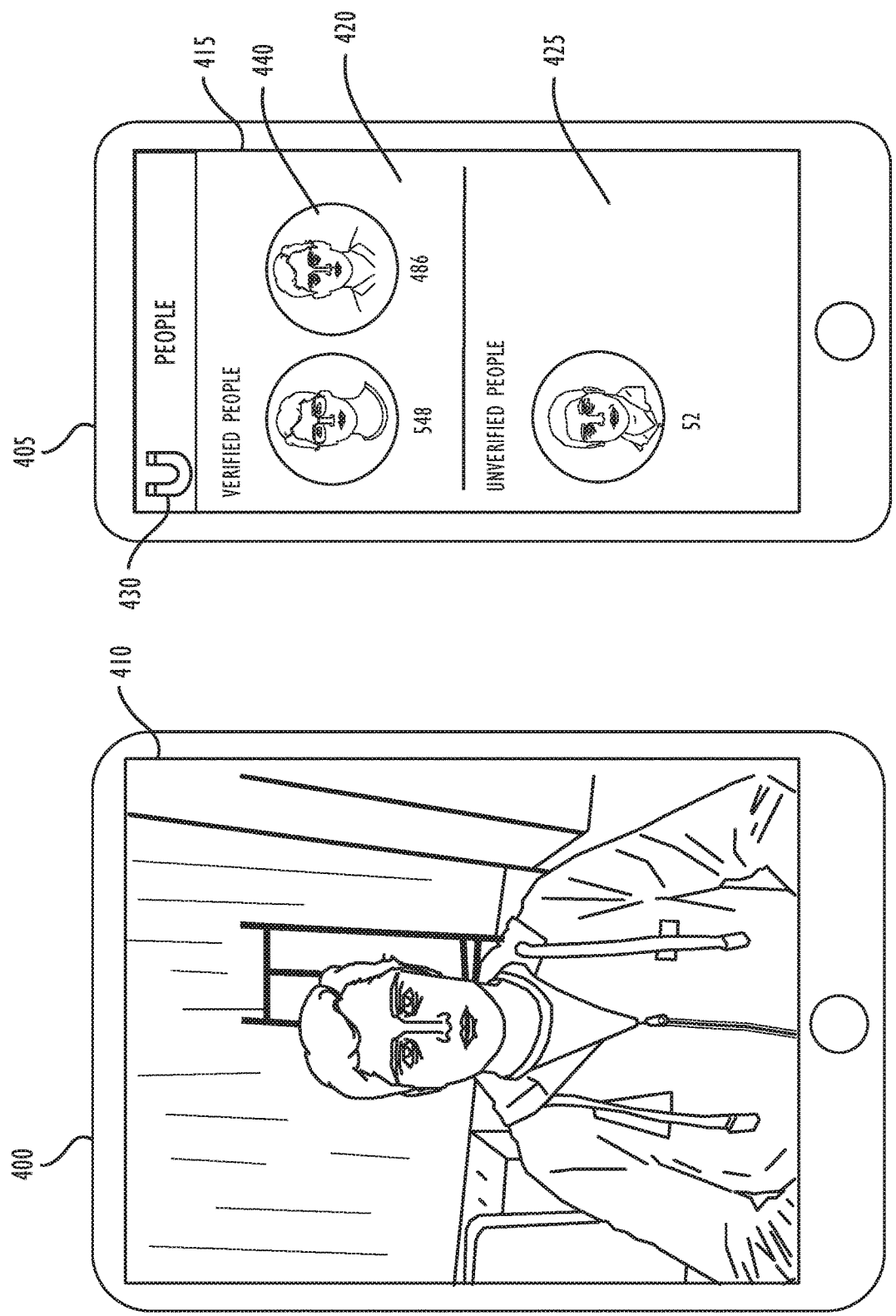
FIG. 4 shows an example system diagram of two computer systems which may be used to transfer media data, according to one or more embodiments.

Referring now to FIG. 4, an example diagram of two devices utilizing the described embodiments is presented. The diagram includes a first (source) electronic device 400 and a second (requesting) electronic device 405. The first electronic device 400 shows an image 410 being captured of a subject (e.g., the featured user). The image is presented in a user interface on a display of first electronic device 400. In one or more embodiments, the featured user may not be associated with a user account from which the electronic device 400 is operated.

FIG. 4 also depicts a second electronic device 405 with a user interface 415 for a media management application. The user interface 415 may provide an organized view of media stored on or accessible by electronic device 405. In the example depicted, the user interface 415 provides a view of media accessible by electronic device 405 as organized by faces that appear in the image. As such, the user interface includes a Verified People portion 420 and an Unverified People portion 425. In one or more embodiments, the Verified People portion 420 may include a graphical indication for one or more people that indicates a collection of images or other media data that includes that person (e.g., the person appears in an image, is heard in a recording, or the like). As depicted, in one or more embodiments, the graphical indication for the person may be accompanied by a number that indicates the number of media files within the collection. For example, the first person on the left in the Verified People portion 420 of the user interface 415 is found in 548 media files because the number "548" is displayed below the graphical indication of the person. Similarly, the collection represented in the Unverified People portion 425 includes collections of photos that include a particular person. In one or more embodiments, collections that include faces for which an object model is available may be listed in the Verified People portion 420, whereas collections that include faces for which an object model is not available are listed in the Unverified People portion 425.

For purposes of this example, the image captured by electronic device 400 is not stored on electronic device 405. However, electronic device 405 does have images of the person captured in the image 410, as is depicted by the graphical representation 440, which indicates that electronic device 405 includes in storage, or has access to, 486 images of the person depicted in image 410 (as the face is the same in both the image 410 and the graphical representation 440).

In one or more embodiments, the user interface 415 may include additional components, such as media request component 430 which may be selected to initiate request of media items from a remote device that match a particular profile, such as images or other media items that match an object model provided by the electronic device 405.

Figure 5:
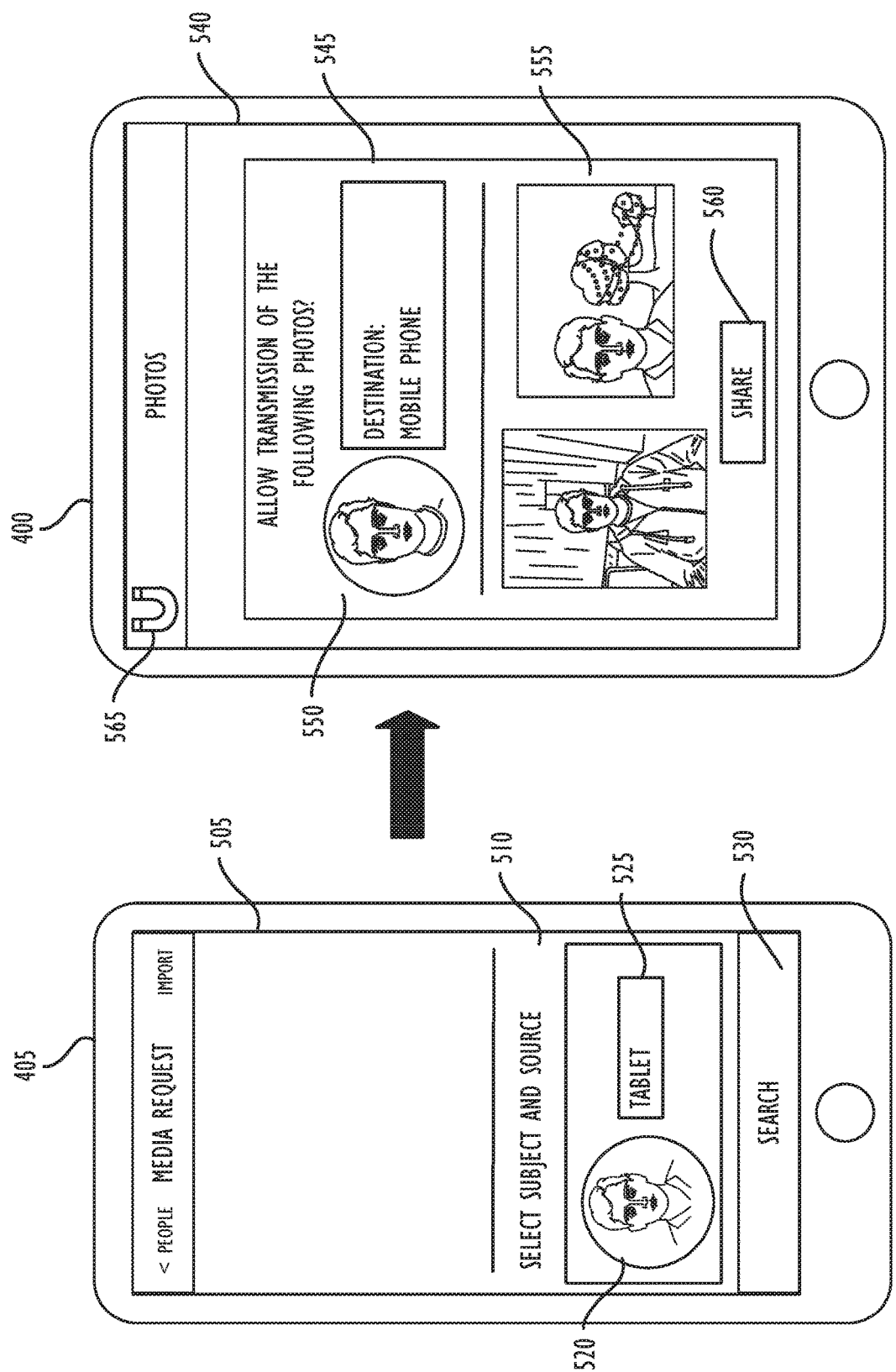
FIG. 5 shows an example system diagram of two computer systems by which the transfer of media items is requested and confirmed, according to one or more embodiments.

Turning to FIG. 5, an example flow is presented in which the second electronic device 405 presents a media request interface 505. The media request interface 505 may be presented, for example, in response to the second electronic device receiving input indicating a selection of the media request component 430 of FIG. 4. According to one or more embodiments, the media request interface may provide a preview portion 605, as well as a selection portion 510. The selection portion 510 of the media request interface 505 may include a portion in which a particular face or object may be selected, such as the object selector component 520. According to one or more embodiments, the object selector component 520 may allow a user to select an object for which to request media items from another device. The object selector component may present, for selection, one or more objects for which an object model is available to the electronic device 405. In addition, in one or more embodiments, the selection portion 510 may include a source selector component 525. In one or more embodiments, the source selector component 525 may indicate one or more sources from which media items may be requested. The sources may be determined to be available, for example, based on known remote devices, devices belonging to accounts available to the second electronic device (e.g., accounts belonging to contacts of a user of second electronic device 405), devices which are detectable over short wave wireless connections, and the like. Further, the source device selector may indicate individual devices and/or may identify one or more devices belonging to one or more contact accounts (e.g., a friend's network of devices).

The object selector component 520 and the source selector component 525 may each provide one or more selectable options in any of various formats. For example, a spinnable wheel for one or each of the components may be presented, selectable text, figures, or other representation related to one or both of the components may be presented, a drop down menu for one or both of the selectable components may be presented, and the like. As depicted in the example, the face of the person presented in the image may be displayed, and may appear different than the face in the image 410 (because the image 410 has not yet been transferred to the second electronic device 405). The media request interface 505 may additionally include a search module 530 which may be configured to accept user input to indicate that a search should be performed based on the selected object selector component 520 and/or source selector component 525. For example, the search module 530 may be a selectable button on the media request interface 505.

In response to a user selecting the desired object (e.g., the face depicted in the object selector component 520, the first electronic device 405 may transmit a request for images matching the search parameters (e.g., the selected object selector component 520 and/or source selector component 525). The request may include additional data, such as an identifier of a user account requesting the images, or predetermined preferences for receiving media items, such as user-selected preferences. As an example, a user of electronic device 405 may be associated with user account preferences that request media in a particular format (i.e., a predetermined resolution), prioritize different types of media over others (i.e., video, audio, images, and the like), etc.

Upon receiving the request from the second client device 405, the first electronic device 400 may display a user interface 540, such as a user interface for a media management application. Additionally, or alternatively, in one or more embodiments, the first electronic device 400 may display a window indicating the request. For example, the request window 545 may prompt the user to approve transmission of the media items that match the search query. The first electronic device 400 may query available media items (e.g., media items stored on the first electronic device 400 or available to electronic device 400 such as on network storage and accessible by a user account). According to one or more embodiments, the request window 545 may include a parameter portion 550 indication of the search parameters for the media requested. Accordingly, the example parameter portion 550 may include an indication of the object of interest that is found in media items requested by the second electronic device 405. Further, in one or more embodiments, the parameter portion 550 may indicate a destination for the requested media items (e.g., the requesting device, such as second electronic device 405). In one or more embodiments, the request window 545 may also include a preview portion 555. The preview portion 555 may display a preview or indication of media items which satisfy the search criteria, and which will be transmitted to the requesting second electronic device 405. According to one or more embodiments, the previewed media items may be user-selectable or otherwise interactive such that a user of the first electronic device 400 may refine which media items are to be transmitted to the requesting device (e.g., second electronic device 405). For example, a user may decline individual media items from being transmitted, or may add additional media items that should be transmitted in response to the request. The request window 545 may include a share module 560, which, when selected by a user through user input, may trigger the transmission of the media items that satisfy the search criteria received from second electronic device 405, and/or the media items displayed in the preview portion 555.

Figure 6:
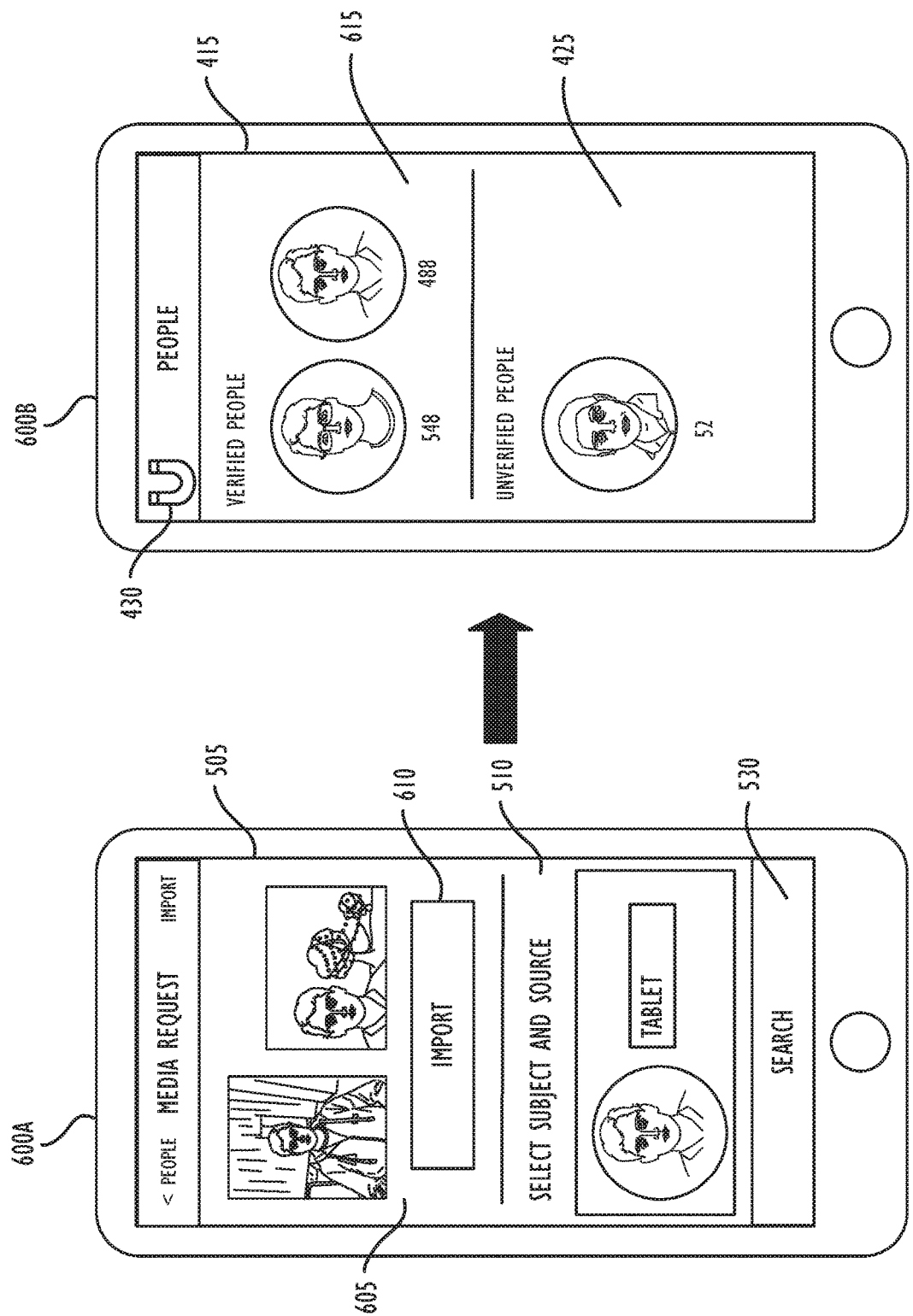
FIG. 6 shows an example system diagram of a computer system importing media data from a source device, according to one or more embodiments.

Turning to FIG. 6, example interfaces for a requesting device receiving the requested media items are described. Electronic device 600A may correspond to second electronic device 405, upon receiving requested media items from first electronic device 400. The second electronic device 600A may display an update to the media request interface 505. The media request interface 505 may now include a preview portion 605 in which an indication of the media items provided by the source electronic device (e.g., first electronic device 400) may be displayed to a user of second electronic device 405. In one or more embodiments. In one or more embodiments, the representation of the media items presented for preview in preview portion 605 may be user selectable and/or associated with a user selection module such that a user of second electronic device 405 may refine the final media items to be received in response to the request. In addition, an import module 610 may be included in the preview portion 605. According to one or more embodiments, the import module 610 may be user selectable such that user selection of the import module 610 triggers a request to receive a non-preview version of the media objects.

Turning to electronic device 600B, an example update to user interface 415 in response to receiving the imported media items. Particularly, user interface 415 now shows an updated Verified People portion 615 by showing that the face that was the object for which media items were received from the first electronic device 400 account for 488 media files because the number "488" is displayed below the graphical indication of the person. As depicted, the number of media files is updated from Verified People portion 615 because the number of media files has increased by 2, corresponding to the 2 imported media items from preview portion 605.

Figure 7:
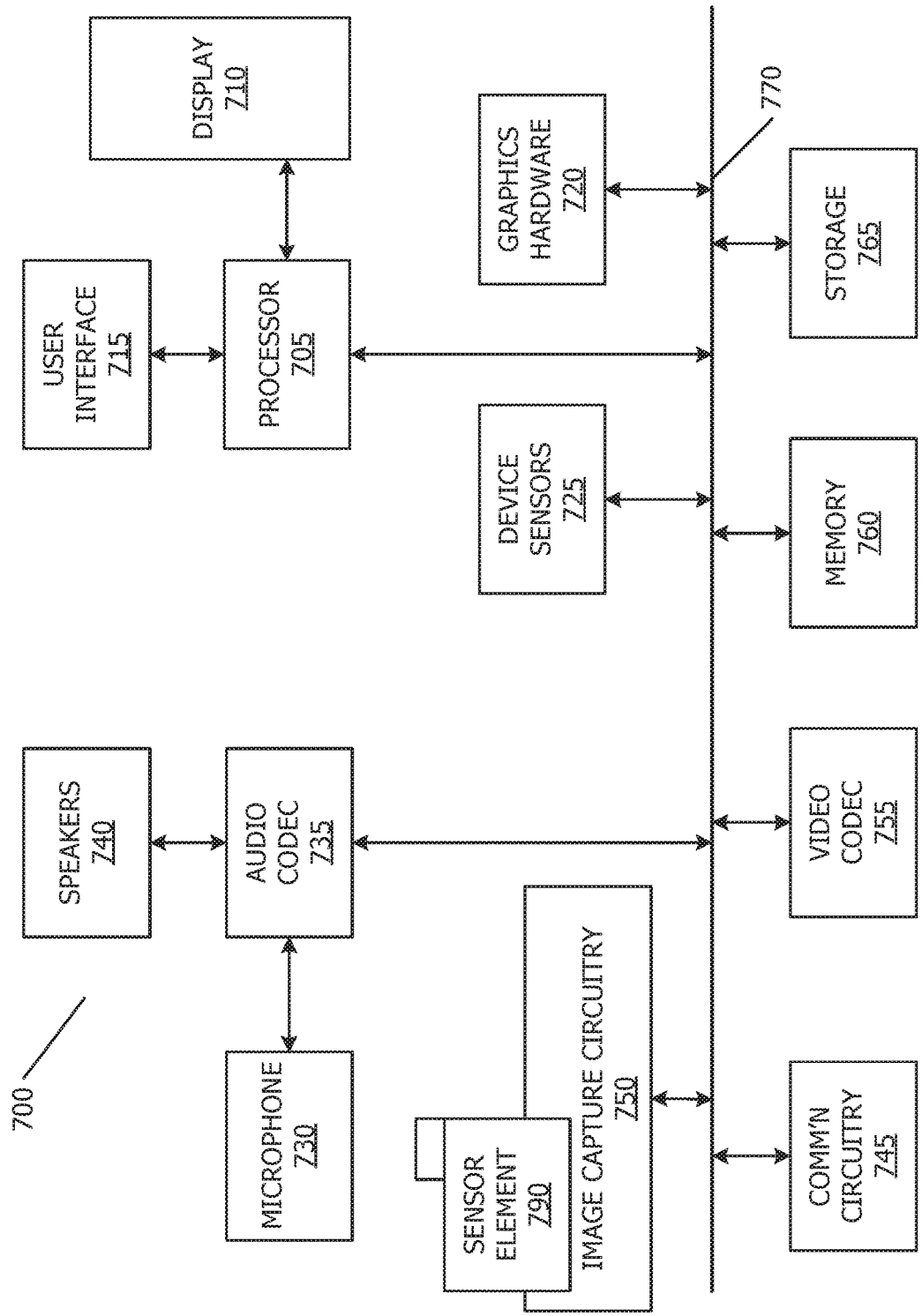
FIG. 7 shows, in block diagram form, a simplified multifunctional device according to one or more embodiments.

Turning to FIG. 7, a simplified functional block diagram of illustrative multifunction device 700 is shown according to one embodiment. Multifunction electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture circuitry 750, video codec(s) 755 (e.g., in support of digital image capture unit 750), memory 760, storage device 765, and communications bus 770. Multifunction electronic device 700 may be, for example, a digital camera or a personal electronic device such as a personal digital assistant (PDA), personal music player, mobile telephone, or a tablet computer.

Processor 705 may execute instructions necessary to carry out or control the operation of many functions performed by device 700 (e.g., such as the generation and/or processing of images and single and multi-camera calibration as disclosed herein). Processor 705 may, for instance, drive display 710 and receive user input from user interface 715. User interface 715 may allow a user to interact with device 700. For example, user interface 715 can take a variety of forms, such as a button, keypad, dial, a click wheel, keyboard, display screen and/or a touch screen. Processor 705 may also, for example, be a system-on-chip such as those found in mobile devices and include a dedicated graphics processing unit (GPU). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable GPU.

Image capture circuitry 750 may include lens assembly 780 associated with sensor element 790. Image capture circuitry 750 may capture still and/or video images. Output from image capture circuitry 750 may be processed, at least in part, by video codec(s) 755 and/or processor 705 and/or graphics hardware 720, and/or a dedicated image processing unit or pipeline incorporated within circuitry 765. Images so captured may be stored in memory 760 and/or storage 765.

Memory 760 may include one or more different types of media used by processor 705 and graphics hardware 720 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory computer readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to tangibly retain computer program instructions or code organized into one or more modules and written in any desired computer programming language. When executed by, for example, processor 705 such computer program code may implement one or more of the methods described herein.

As described above, one aspect of the present technology is the gathering and use of data available from various sources to generate models of faces and to request image data. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to request and receive image data from remote users. Accordingly, use of such personal information data enables users to share information and communicate easily. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

The scope of the disclosed subject matter therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable instructions executable by one or more processors to:
receive, on a first device, user input to obtain second media items comprising a representation of an object from a second device;
obtain, on the first device, an object model for the object, wherein the object model comprises a feature representation of one or more identifying characteristics of the object,
wherein the feature representation is determined from representations of the object appearing in first media items stored in a media library of the first device, and
wherein the object model for the object is associated with the first device;
generate a pull request comprising the object model, and at least one parameter to be used by the second device to respond to the pull request;
transmit the pull request from the first device to the second device,
wherein the second media items are identifiable on the second device based on the object model and the at least one parameter;
receive, in response to the pull request, a plurality of second media items comprising a representation of the object from the second device, wherein the response includes at least one confidence level calculated by the second device to indicate to the first device the plurality of media items include the object represented by the object model, and wherein the at least one confidence level is greater than a threshold confidence value; and
store the plurality of second media items received from the second device on the first device.

2. The non-transitory computer readable medium of claim 1, wherein the computer readable instructions to obtain the object model further comprise computer readable instructions executable by one or more processors to:
generate the object model based on the representation of the object appearing in the first media items stored in the media library of the first device.

3. The non-transitory computer readable medium of claim 2, further comprising computer readable instructions executable by one or more processors to:
present a prompt to a user of the first device to confirm an identity of the object in one or more of the first media items; and
in response to receiving a confirmation of the identity of the object, utilize the one or more of the plurality of the first media items to generate the object model.

4. The non-transitory computer readable medium of claim 1, wherein the feature representation is associated with audio data corresponding to the object.

5. The non-transitory computer readable medium of claim 4, wherein the second media items on the second device comprise video files associated with an audio recording, and wherein the audio recording comprises audio data associated with the object.

6. The non-transitory computer readable medium of claim 1, wherein the object comprises a person.

7. The non-transitory computer readable medium of claim 1, wherein a first distance between the feature representation of any representations of the object appearing in the first media items stored in the media library on the first device is smaller than a second distance between the feature representation of any representation of the object and any representations of a different object appearing in the first media items stored in the media library on the first device.

8. The non-transitory computer readable medium of claim 1, wherein the feature representation is associated with image data corresponding to the object.

9. The non-transitory computer readable medium of claim 1, wherein the at least one parameter is selected from a group consisting of: privacy parameters, temporal parameters, geographic parameters, and media type parameters.

10. A non-transitory computer readable medium comprising computer readable instructions executable by one or more processors to:
receive, from a requesting device, a pull request for second media items on a source device,
wherein the pull request comprises an object model, and at least one parameter to be used by the source device to respond to the pull request,
wherein the object model comprises a representation of one or more identifying characteristics of an object, wherein the representation is determined from representations of the object appearing in media items stored in a media library of the requesting device, and
wherein the object model for the object is associated with the requesting device;

identify, based on the object model and the at least one parameter, one or more second media items stored on the source device that include a representation of the object;

determine at least one confidence level that the one or more second media items include the object represented by the object model;

request authorization to send the one or more second media items; and in response to an affirmative authorization, send the one or more second media items and the at least one confidence level to the requesting device.

11. The non-transitory computer readable medium of claim 10, further comprising computer readable instructions executable by one or more processors to:

present a prompt to a user of the source device to request the authorization to send the one or more second media items.

12. The non-transitory computer readable medium of claim 10, further comprising computer readable instructions executable by one or more processors to:

identify a local object model for the object; and modify the local object model based on the object model of the pull request.

13. The non-transitory computer readable medium of claim 10, wherein a first distance between the representation of any representations of the object appearing in first media items stored in the media library on the requesting device is smaller than a second distance between the representation of any representation of the object and any representations of a different object appearing in the first media items stored in the media library on the requesting device.

14. A system for providing media data, comprising:
one or more processors; and
a hardware memory coupled to the one or more processors and comprising computer readable code executable by the one or more processors to:
receive, on a first device, user input to obtain second media items comprising a representation of an object from a second device;
obtain, on the first device, an object model for the object, wherein the object model comprises a feature representation of one or more identifying characteristics of the object,
wherein the feature representation is determined from representations of the object appearing in first media items stored in a media library of the first device, and
wherein the object model for the object is associated with the first device;

generate a pull request comprising the object model, and at least one parameter to be used by the second device to respond to the pull request; and transmit the pull request from the first device to the second device, wherein the second media items are identifiable on the second device based on the object model and the at least one parameter;

receive, in response to the pull request, a plurality of second media items comprising a representation of the object from the second device, wherein the response includes a confidence level calculated by the second device to indicate to the first device that the plurality of second media items include the object represented by the object model, and wherein the at least one confidence level is greater than a threshold confidence value; and store the plurality of second media items received from the second device on the first device.

15. The system of claim 14, wherein the computer readable code executable by the one or more processors to obtain the object model further comprises computer readable code executable by the one or more processors to:

generate the object model based on the representations of the object appearing in the first media items stored in the media library of the first device.

16. The system of claim 15, further comprising computer readable code executable by the one or more processors to:

present a prompt to a user of the first device to confirm an identity of the object in one or more of the plurality of the first media items; and in response to receiving a confirmation of the identity of the object, utilize the one or more of the plurality of the first media items to generate the object model.

17. The system of claim 14, wherein the object comprises a person.

18. The system of claim 14, wherein a first distance between the feature representation of any representations of the object appearing in the first media items stored in the media library on the first device is smaller than a second distance between the feature representation of any representations of the object and any representations of a different object appearing in the first media items stored in the media library on the first device.

19. The system of claim 14, wherein the feature representation is associated with image data corresponding to the object.

20. The system of claim 14, wherein the feature representation is associated with audio data corresponding to the object.

* * * * *